US010590590B2

(12) United States Patent
Lee et al.

(10) Patent No.: US 10,590,590 B2
(45) Date of Patent: Mar. 17, 2020

(54) WASHING MACHINE AND METHOD OF MANUFACTURING DOOR THEREOF

(71) Applicant: SAMSUNG ELECTRONICS CO., LTD., Suwon-si, Gyeonggi-do (KR)

(72) Inventors: Sang Bin Lee, Suwon-si (KR); Jae Young Kim, Busan (KR); Dong Young Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 625 days.

(21) Appl. No.: 14/149,281

(22) Filed: Jan. 7, 2014

(65) Prior Publication Data
US 2014/0191643 A1 Jul. 10, 2014

(30) Foreign Application Priority Data

Jan. 9, 2013 (KR) .................. 10-2013-0002658
Aug. 1, 2013 (KR) .................. 10-2013-0091715

(51) Int. Cl.
*D06F 39/14* (2006.01)
*B29C 45/16* (2006.01)

(52) U.S. Cl.
CPC .............. *D06F 39/14* (2013.01); *B29C 45/16* (2013.01)

(58) Field of Classification Search
None
See application file for complete search history.

(56) References Cited

U.S. PATENT DOCUMENTS

| 7,694,537 B2 * | 4/2010 | Ha ................. D06F 39/14 68/196 |
| 2006/0117809 A1 | 6/2006 | Ha et al. |
| 2006/0117813 A1 | 6/2006 | Ha et al. |
| 2007/0256459 A1 | 11/2007 | Yoon et al. |
| 2010/0031581 A1 | 2/2010 | Kang et al. |

FOREIGN PATENT DOCUMENTS

| CN | 1475621 | 2/2004 |
| CN | 101671930 | 3/2010 |
| CN | 102648315 | 8/2012 |
| DE | 20 2009 005 678 | 7/2009 |

(Continued)

OTHER PUBLICATIONS

EP 1762650 A2 translation.*

(Continued)

*Primary Examiner* — Rita P Adhlakha
(74) *Attorney, Agent, or Firm* — Staas & Halsey LLP

(57) ABSTRACT

A washing machine includes a cabinet defining an external appearance thereof and having an insertion port, a tub arranged inside the cabinet and capable of accommodating wash water, a drum arranged inside the tub and capable of accommodating laundry, and a door to open and close the insertion port, and the door includes a door cover including a first section through which light penetrates, and a second section formed integrally with the first section such that at least a portion of the second section is projected through the first section. Therefore, manufacturing costs of the door may be reduced without the need for post-processing, and it may be possible to provide the eco-friendly washing machine having pleasing design aesthetics.

6 Claims, 19 Drawing Sheets

(56) References Cited

FOREIGN PATENT DOCUMENTS

| DE | 10 2009 047 595 | 6/2011 |
|----|-----------------|--------|
| EP | 1 386 994 | 7/2003 |
| EP | 1 762 650 | 8/2006 |
| EP | 2 243 874 | 4/2009 |
| EP | 2 302 127 | 9/2010 |
| WO | WO 02/34994 | 5/2002 |
| WO | WO 2011/069814 | 6/2011 |

OTHER PUBLICATIONS

WO 2011069814 A1 translation.*
European Communication under Rule 71(3) EPC dated Nov. 6, 2015 in related European Application No. 14150653.5.
European Search Report dated Apr. 9, 2014 in corresponding European Application No. 14150653.5.
International Search Report dated Apr. 10, 2014 in corresponding International Application No. PCT/KR2014/000118.
Russian Office Action dated Sep. 15, 2016 from Russian Patent Application No. 2015127625/12(042883), 6 pages.
Chinese Decision on Grant dated Aug. 31, 2017 in related Chinese Application No. 201410010806.
Canadian Office Action dated Mar. 24, 2017 from Canadian Patent Application No. 2,897,595.
Chinese Office Action dated Jan. 4, 2017 from Chinese Patent Application No. 201410010806.9, 17 pages.
Russian Office Action dated Jan. 12, 2017 from Russian Patent Application No. 2015127625/12(042883), 13 pages.
Indian Office Action dated Dec. 26, 2018, in corresponding Indian Patent Application No. 6870/DELNP/2015.
Korean Office Action dated Aug. 27, 2019 in corresponding Korean Patent Application No. 10-2013-0091715.

* cited by examiner

WASHING MACHINE AND METHOD OF MANUFACTURING DOOR THEREOF

CROSS-REFERENCE TO RELATED APPLICATIONS

This application claims the benefit of Korean Patent Application Nos. 10-2013-0002658 and 10-2013-0091715, filed on Jan. 9, 2013, and Aug. 1, 2013, respectively, in the Korean Intellectual Property Office, the disclosures of which are incorporated herein by reference.

BACKGROUND

1. Field

Embodiments of the present disclosure relate to a washing machine having an improved structure which enables simplification of a door manufacturing process, and thus an improved method of manufacturing a door thereof.

2. Description of the Related Art

Washing machines are machines to wash laundry using electricity, and are broadly classified into a pulsator type and a drum type according to washing manners. A drum type washing machine includes a cabinet, a tub provided to accommodate wash water inside the cabinet, a drum rotatably installed inside the tub, a motor to rotate the drum, and a door to open and close an opening portion.

In a drum type washing machine, washing is performed via tumbling, and a lifter to lift and thereby tumble laundry is disposed within an inner container thereof.

The door includes a door cover defining an external appearance thereof, a glass protruding inward of the washing machine, and a glass holder by which the glass is fixed.

In recent times, decorations have begun to be added to the door cover, in order to enhance the design aesthetics of the door cover and to distinguish the door cover from the cabinet. For these decorations, post-processing such as color spraying, chromium plating, or bonding is conventionally carried out. However, these processes generate harmful wastewater and other environmental contaminants, and costs associated with such post-processing are prohibitive.

SUMMARY

Therefore, it is an aspect of the present disclosure to provide a washing machine including a door, a door cover of which is formed by double injection molding.

Additional aspects of the disclosure will be set forth in part in the description which follows and, in part, will be apparent from the description, or may be learned by practice of the disclosure.

In accordance with one aspect of the present disclosure, a washing machine includes a cabinet defining an external appearance thereof and having an insertion port, an outer container arranged inside the cabinet and capable of accommodating wash water, an inner container arranged inside the outer container and capable of accommodating laundry, and a door to open and close the insertion port, wherein the door includes a door cover including an opening arranged at the center thereof, a first section which is arranged outside the door cover and made of a transparent material such that light penetrates through the first section, and a second section which is arranged inside the first section to be concentric with the first section, made of an opaque material to be projected through the first section, and formed integrally with the first section, the first section includes a first area which is coupled with the second section such that the second section is capable of being projected onto the first section, and a second area which is not coupled with the second section, and the second area is located farther away from the center of the opening than the first area.

The first section may include an oblique portion inclined by a predetermined angle.

At least one of the first and second sections may be formed with a roughened portion configured by alternately forming a protrusion portion protruding from a surface of the first or second section and a recessed portion recessed into the surface thereof.

A gap may be defined such that at least a portion of the first section is spaced apart from at least a portion of the second section with the gap being interposed therebetween, so that light is scattered between the first section and the second section.

The washing machine may further include a glass holder coupled to the rear of the door cover.

The washing machine may further include a glass coupled between the door cover and the glass holder.

The first section may be made of at least one of PMMA (polymethyl methacrylate) and PC (polycarbonate).

The second section may be made of an ABS (acrylonitrile butadiene styrene copolymer) resin.

In accordance with another aspect of the present disclosure, a washing machine includes a cabinet defining an external appearance thereof and having an insertion port, an outer container arranged inside the cabinet and capable of accommodating wash water, an inner container arranged inside the outer container and capable of accommodating laundry, and a door to open and close the insertion port, wherein the door includes a first section made of a transparent material in at least a portion of a door cover and a second section made of an opaque material in at least a portion of the door cover, the first section includes a first area which is coupled with the second section and a second area which is not coupled with the second section, and the second area appears a metallic color due to scattering of light.

The first and second sections may be formed along an edge of the door cover, the first section may be located outside the door cover, and the second section may be located inside the first section.

A gap for scattering of light may be defined between the first section and the second section.

The first section may include an oblique portion inclined inward of the washing machine by an angle of about 40° to 50°.

The first section may further include a roughened portion which has a protrusion portion protruding from an inner surface of the first section and a recessed portion recessed outward of the door cover from the inner surface thereof.

In accordance with another aspect of the present disclosure, a washing machine includes a cabinet defining an external appearance thereof and having an insertion port, a tub arranged inside the cabinet and capable of accommodating wash water, a drum arranged inside the tub and capable of accommodating laundry, and a door to open and close the insertion port, wherein the door includes a first section which is arranged in at least a portion thereof, and a second section which is injection-molded integrally with the first section, and an oblique portion is disposed at one side of at least one of the first and second sections, and is provided so as to visually distinguish a difference in external appearance between the cabinet and a door cover due to a difference in transmissivity of light generated by the oblique portion.

The second section may be located inside the first section.

The oblique portion may be formed to be inclined inward of the washing machine.

The washing machine may further include a recessed portion configured such that at least a portion of the cabinet with which the door comes into contact is recessed inward of the washing machine, and the recessed portion may come into contact with a glass holder.

In accordance with a further aspect of the present disclosure, a method of manufacturing a door of a washing machine includes performing primary injection molding of a first section through which incident light penetrates, and performing secondary injection molding of a second section located inside the first section and configured such that at least a portion of the second section is projected through the first section.

The first section may be made of a transparent material, and the second section may be made of a colored opaque material.

The method may further include performing a cooling process for a predetermined time after the primary injection molding of the first section.

The method may further include performing a cooling process for a predetermined time after the secondary injection molding of the second section.

The first section may include an oblique portion inclined by a predetermined angle.

The first and second sections may be provided at a door cover coupled outside a door.

The method may further include performing a process via which, after the injection molding of the door cover, a glass is coupled to the door cover.

The method may further include performing a process via which, after the coupling of the glass to the door cover, a glass holder is coupled to the glass in order to fix the glass.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
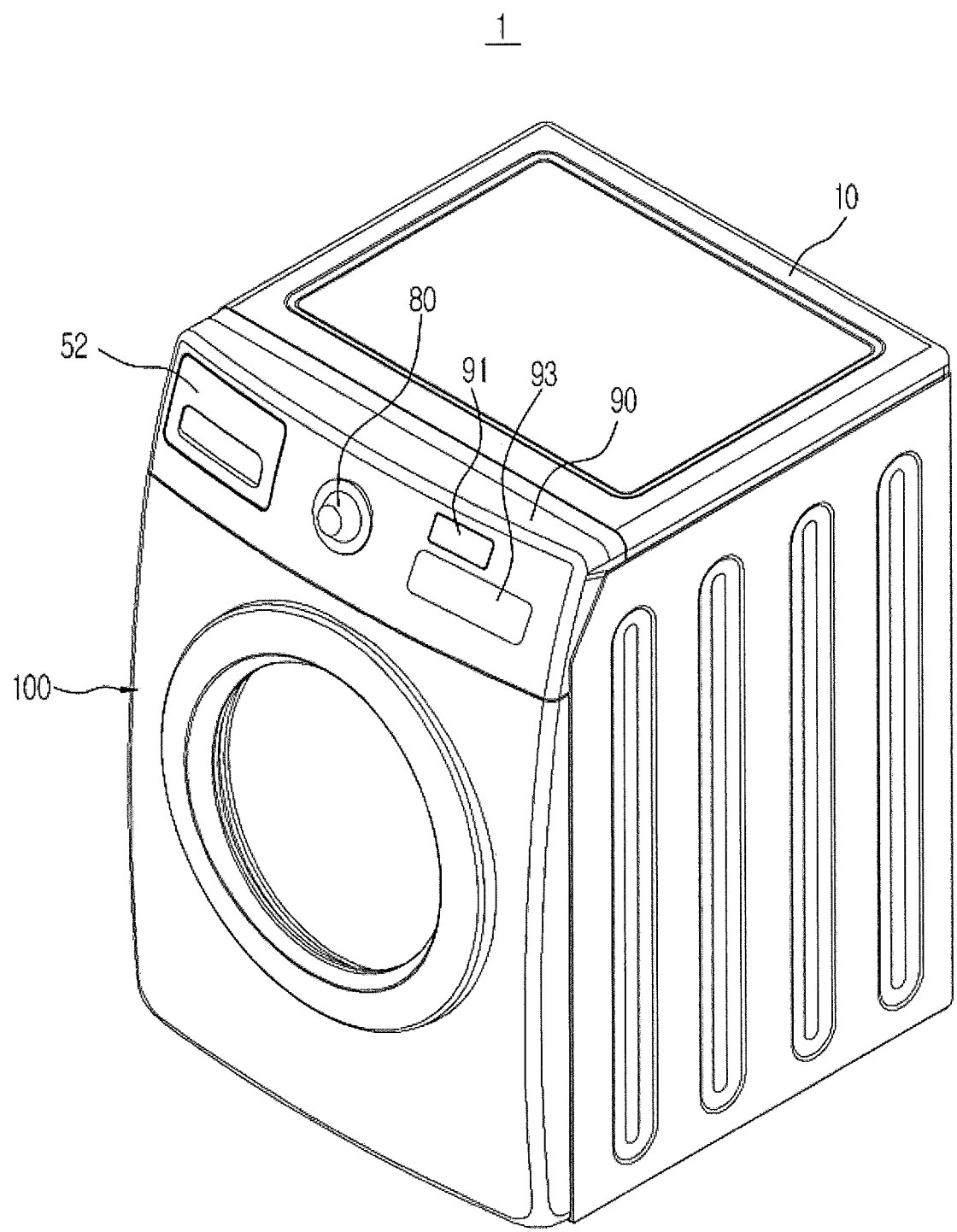
FIG. 1 is a perspective view of a washing machine according to an embodiment of the present disclosure.

Reference will now be made in detail to the embodiments of the present disclosure, examples of which are illustrated in the accompanying drawings, wherein like reference numerals refer to like elements throughout. Hereinafter, although a drum washing machine will be described by way of example, the present disclosure is not limited thereto.

Figure 2:
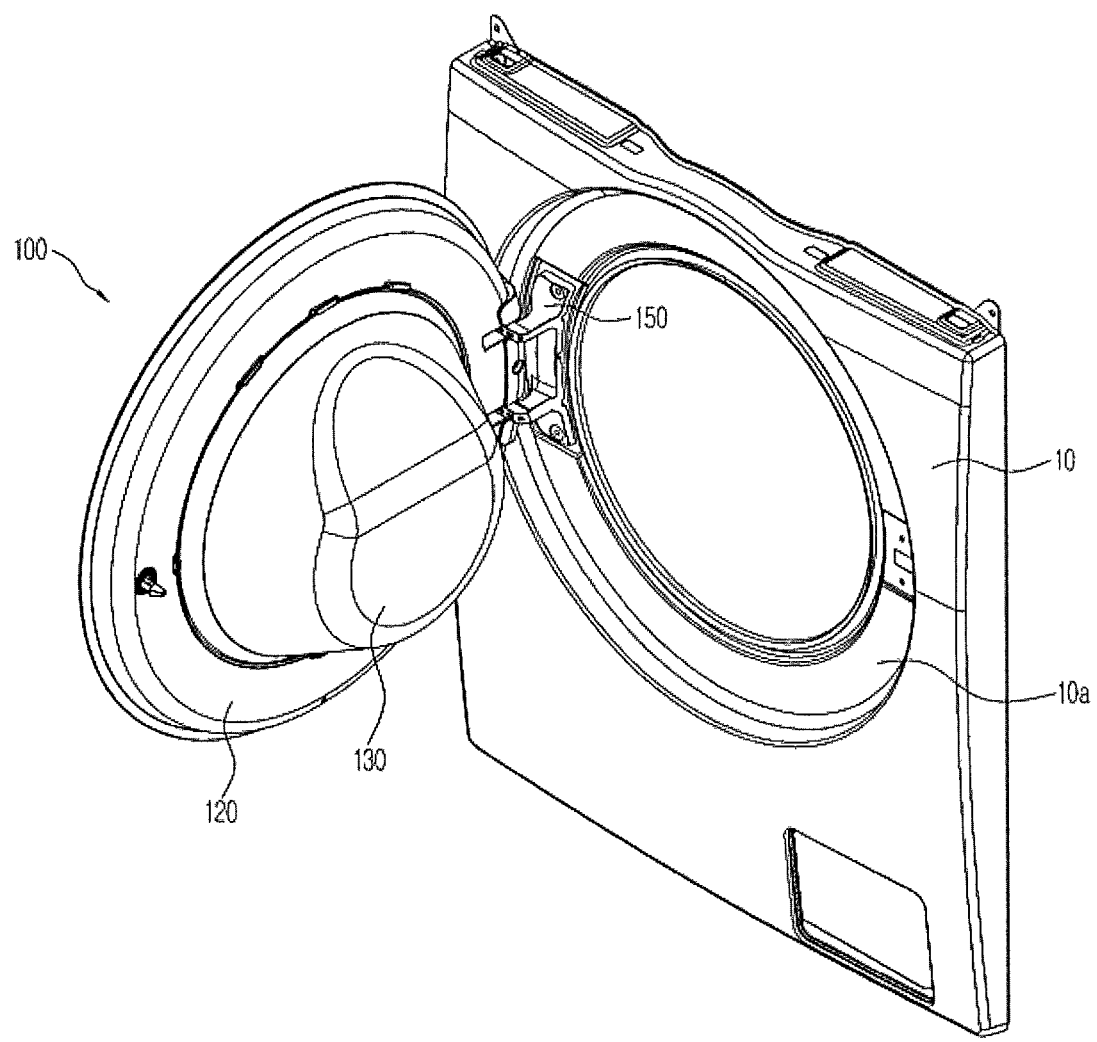
FIG. 2 is a perspective view illustrating an opened state of a door of the washing machine according to the embodiment of the present disclosure.
Figure 3:
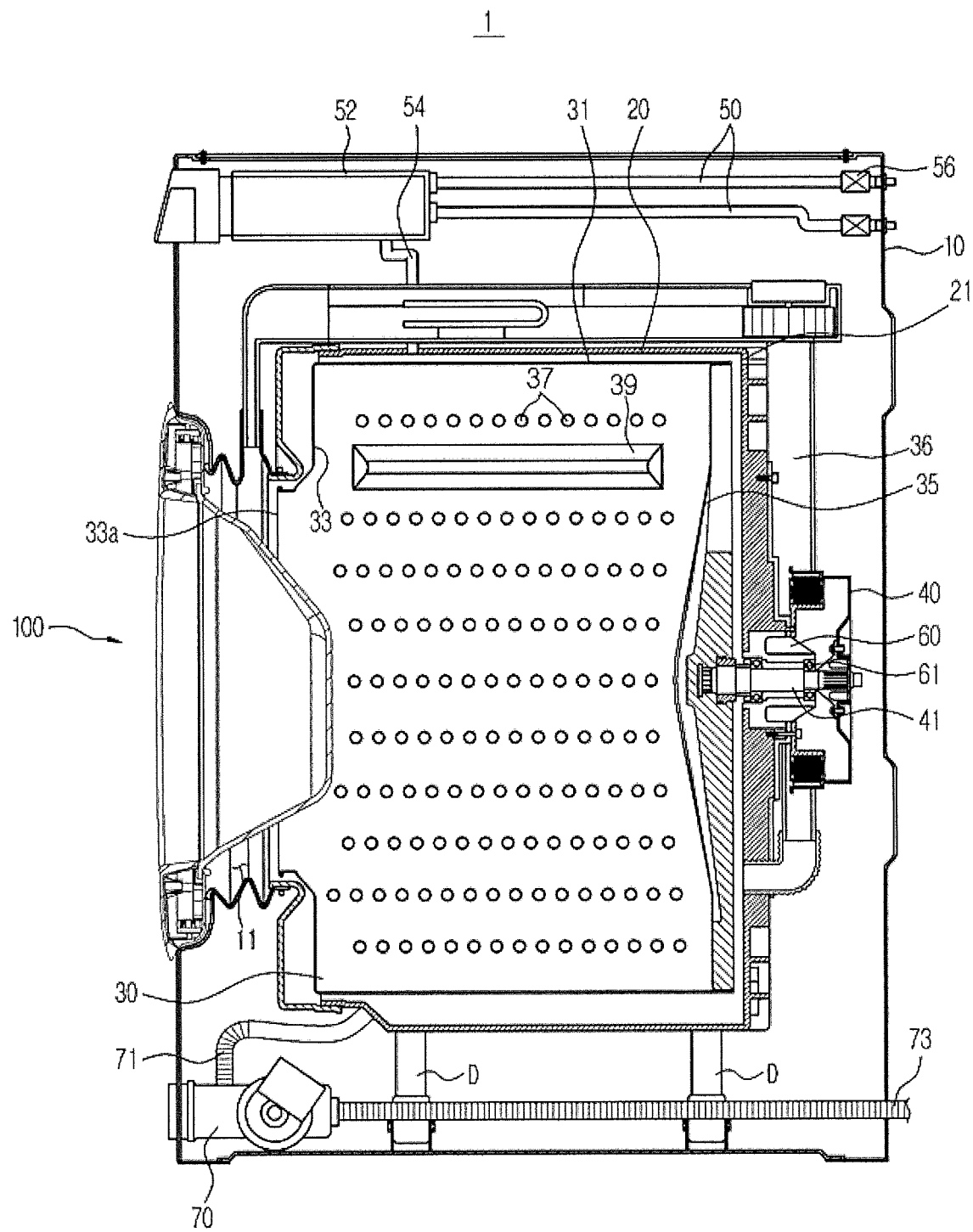
FIG. 3 is a cross-sectional view of the washing machine according to the embodiment of the present disclosure.

FIG. 1 is a perspective view of a washing machine according to an embodiment of the present disclosure. FIG. 2 is a perspective view illustrating an opened state of a door of the washing machine according to the embodiment of the present disclosure. FIG. 3 is a cross-sectional view of the washing machine according to the embodiment of the present disclosure.

As shown in FIGS. 1 to 3, the washing machine 1 includes a cabinet 10, a tub 20 arranged inside the cabinet, a drum 30 rotatably arranged inside the tub 20, and a motor 40 to drive the drum 30.

The cabinet 10 is formed, at a front portion thereof, with an insertion port 11 through which laundry may be inserted into the drum 30, and the insertion port 11 is opened and closed by a door 100 mounted to the front portion of the cabinet 10.

A recessed portion 10a recessed inward of the washing machine 1 is provided in at least a portion of the cabinet 10 with which the door 100 comes into contact when the insertion port 11 is closed. The recessed portion 10a may be formed along an edge portion of the insertion port 11. In addition, the recessed portion 10a may be provided corresponding to a shape of the door 100, and thus since the door 100 is coupled to the recessed portion 10a at the time of being closed, elimination of a part of the door 100 protruding from the surface of the cabinet 10 may be possible.

The tub 20 is installed, at an upper portion thereof, with water supply tubes 50 to supply wash water to the tub 20. Each of the water supply tubes 50 is connected, at one side thereof, with a water supply valve 56 while being connected, at the other side thereof, with a detergent box 52.

The detergent box 52 is connected to the drum 30 through a connection tube 54. Water supplied through the water supply tube 50 is introduced into the drum 30 together with detergent via the detergent box 52.

The tub 20 is supported by dampers D, and the dampers D connect an inside bottom surface of the cabinet 10 to an outer surface of the tub 20.

The drum 30 includes a cylindrical portion 31, a front portion 33 disposed in the front of the cylindrical portion 31, and a rear portion 35 disposed in the rear of the cylindrical portion 31.

The front portion 33 is formed with an opening 33a for insertion of laundry, and the rear portion 35 is connected with a drive shaft 41 to which the motor 40 transmits power.

A plurality of through holes 37, through which wash water passes, are formed around the drum 30, and a plurality of lifters 39 are installed on an inner peripheral surface of the drum 30 so that, during rotation of the drum 30, laundry is tumbled therewithin.

The drive shaft 41 is disposed between the drum 30 and the motor 40. One end of the drive shaft 42 is connected to the rear portion 35 of the drum 30, and the other end of the drive shaft 41 extends outside a rear wall 21 of the tub 20.

When the motor 40 drives the drive shaft 41, the drum 30 connected to the drive shaft 41 rotates about the drive shaft 41.

The rear wall 21 of the tub 20 is provided with a bearing housing 60 to rotatably support the drive shaft 41.

The bearing housing 60 may be made of an aluminum alloy, and be inserted into the rear wall 21 of the tub 20 during injection molding of the tub 20.

Bearings 61 are installed between the bearing housing 60 and the drive shaft 41 so that the drive shaft 41 may smoothly rotate.

Below the tub 20, there are provided a drain pump 70 to discharge water in the tub 20 to the outside of the washing machine 1, a connection hose 71 which connects the tub 20 to the drain pump 70 such that water in the tub 20 may be introduced into the drain pump 70, and a drain hose 73 which guides water pumped by the drain pump 70 to the outside of the washing machine 1.

The tub 20 may be provided with a drying unit 36 which dries air in the tub 20 and then supplies the dried air into the tub 20 again.

The cabinet 10 is provided, at a front upper portion thereof, with a display window 91 through which light emitted from a graphic display (not shown) penetrates so that a user may identify the penetrated light, and a control panel 90 including an operation portion 93 via which a user selects an option to control operation of the washing machine 1.

The graphic display (not shown) may be provided at the rear of the control panel 90 such that a user may control operation of the washing machine 1 depending upon the option selected by the user.

The control panel 90 may be provided with at least one knob 80. The knob 80 may be turned to adjust operation status or operation level.

Figure 4A:
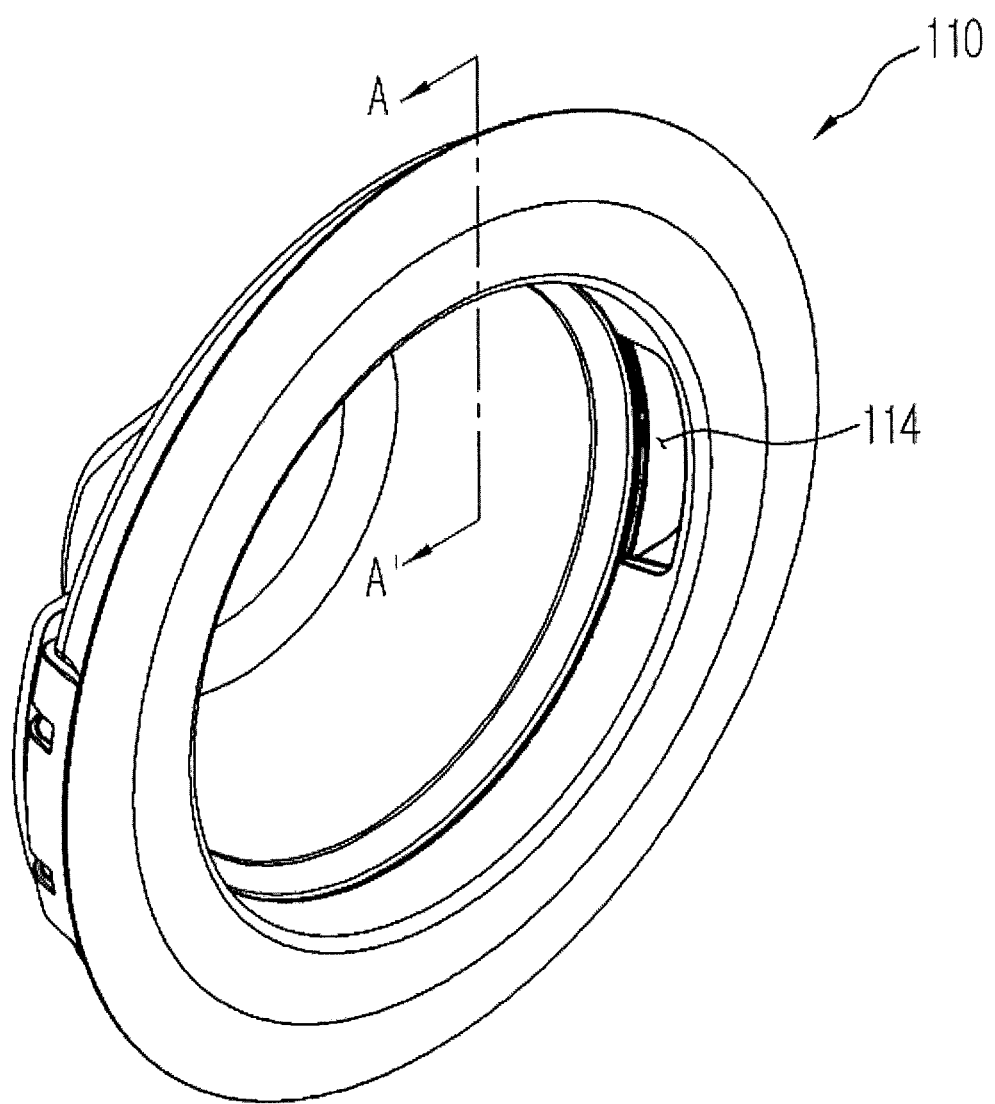
FIG. 4A is a view illustrating the front of the door according to the embodiment of the present disclosure.
Figure 4B:
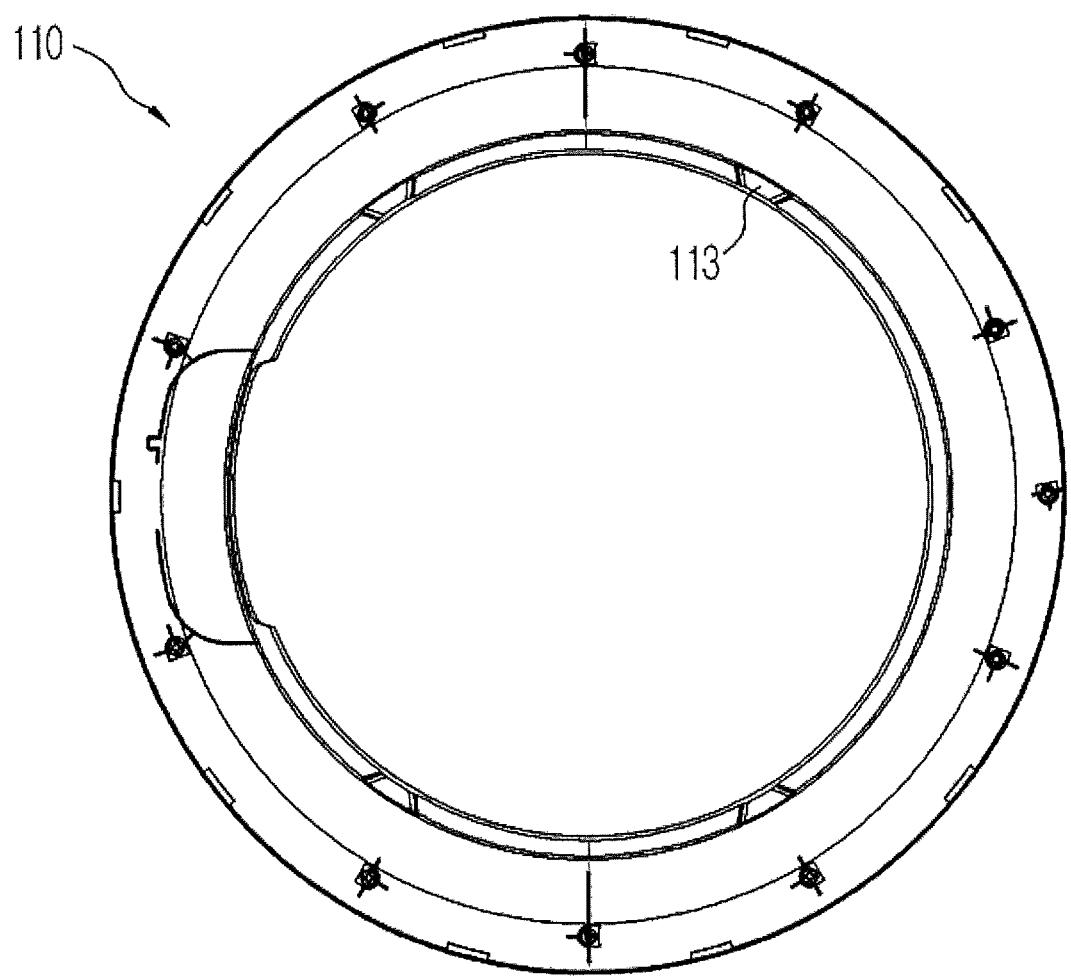
FIG. 4B is a view illustrating the rear of a door cover according to the embodiment of the present disclosure.
Figure 5:
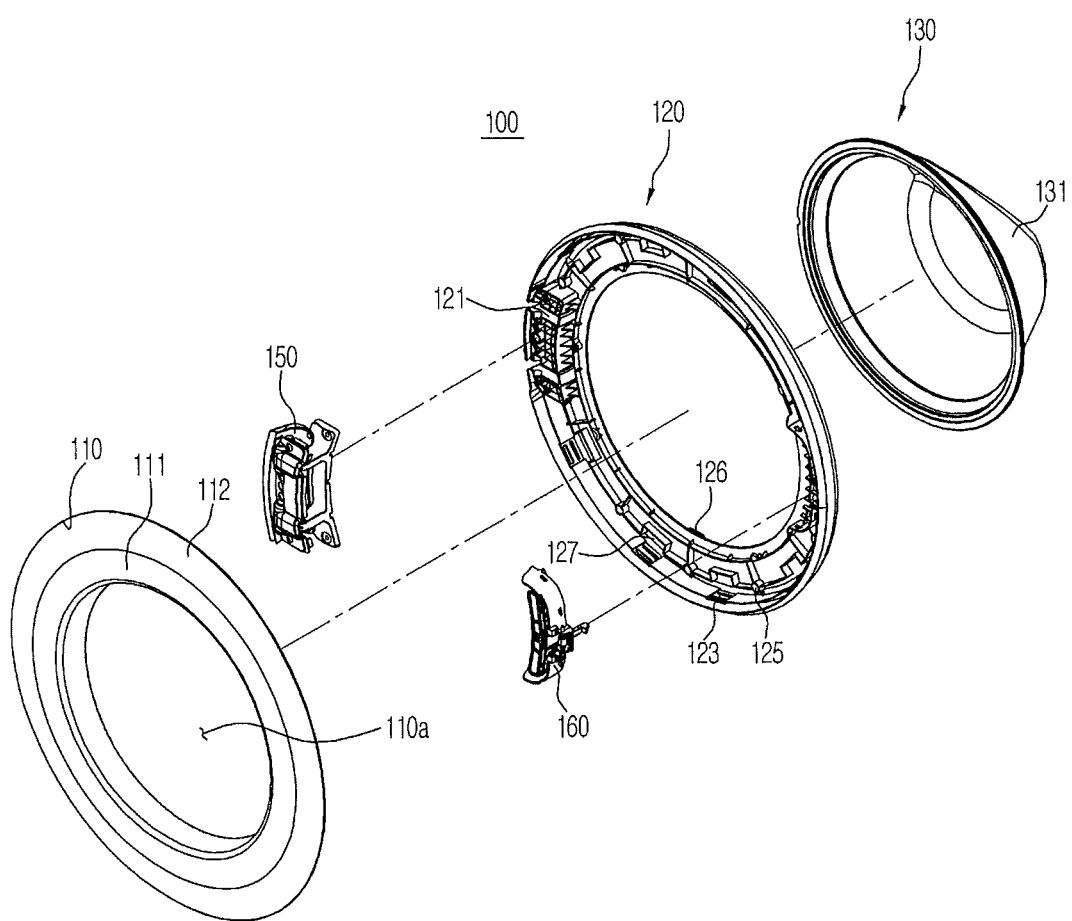
FIG. 5 is an exploded perspective view of the door according to the embodiment of the present disclosure.

FIG. 4A is a view illustrating the front of the door according to the embodiment of the present disclosure. FIG. 4B is a view illustrating the rear of a door cover according to the embodiment of the present disclosure. FIG. 5 is an exploded perspective view of the door according to the embodiment of the present disclosure.

As shown in FIGS. 4A, 4B and 5, the door cover 110 has an opening 110a at the center thereof and includes a first section 111 and a second section 112. The first section 111 is configured such that incident light upon the door cover 110 penetrates through the first section 111. The second section 112 is configured such that at least a portion of the second section 112 is projected onto the first section 111. Accordingly, the at least a portion of the second section 112 may be viewed through the first section 111 from the outside. The first and second sections 111 and 112 are formed along an edge portion of the door cover 110. The first section 111 may be located outside of the door cover 110, and the second section 112 may be located inside the first section 111. In other words, the first and second sections 111 and 112 may be provided in a concentric form.

The door 100 may be provided, at one side thereof, with a grip portion 114 which may be grasped by a user in order to open and close the door 100. In the embodiment of the present disclosure, the grip portion 114 may be formed by denting at least a portion of an inner edge portion of the door cover 110. The first section 111 may be provided to surround the inner edge portion of the door cover 110 at which the grip portion 114 is located. The second section 112 is located inside the first section 111, so that the color and the material of the grip portion 114 are visible from the outside.

In the embodiment of the present disclosure, the first section 111 may be made of a transparent material, whereas the second section 112 may be made of an opaque material. In particular, the second section 112 may be made of a colored opaque material. As an example, the first section 111 may be made of at least one of plastics such as PMMA (polymethyl methacrylate) and PC (polycarbonate). The second section 112 may be made of an ABS (acrylonitrile butadiene styrene copolymer) resin.

The first and second sections 111 and 112 may be formed integrally by double injection molding. In the embodiment of the present disclosure, the first section 111 is primarily injection-molded and the second section 112 is secondarily injection-molded. Conversely, the second section 112 may be primarily injection-molded and the first section 111 may be secondarily injection-molded.

The rear of the door cover 110 is formed with injection holes 113 through which an injection material is infused. In the embodiment of the present disclosure shown in the drawings, four injection holes 113 may be provided. These four injection holes 113 are to be formed after the secondary injection molding and eight injection holes may be provided in total by adding additional injection holes after primary injection molding.

The rear of the door cover 110 may be provided with components for connection of the door cover 110 to a glass holder 120, as will be described later.

As shown in FIG. 5, the door 100 includes a door cover 110 located at the outermost side thereof, a glass 130 protruding inward of the washing machine, and a glass holder 120 coupled to the door cover 110 to support the glass 130.

Although the door 100 is provided in a circular form according to the embodiment, the present disclosure is not limited thereto. The door cover 110 defines the front of the door 100, and the rear of the door cover 110 is provided with a component for coupling of the door cover 110 to the glass holder 120.

In response to this, the front of the glass holder 120 is provided with a component for coupling of the door cover 110 to the glass holder 120. The glass holder 120 may come into contact with the recessed portion of the cabinet 10 when the door 100 is closed. In addition, the glass holder 120 may be provided with a glass seating portion 126 which couples the glass 130 to the glass holder 120. The glass 130 may be provided with a glass body 131 and a glass rib 132 which couples the glass 130 to the glass holder 120.

The glass holder 120 is disposed between the door cover 110 and the glass 130, and may include at least one hook groove 123 so as to be coupled to the door cover 110. In addition, the glass holder 120 may be preliminarily provided with an additional coupling hole 125 coupled with a fastening member (not shown). Thus, the glass holder 120 and the door cover 110 may also be coupled by the hook structure or using the fastening member (not shown). In addition, the glass holder 120 may be provided a rib structure 127 for reinforcement.

One side of the glass holder 120 may be provided with a coupling portion 121 coupled to a hinge unit 150 about which the door 100 may pivot. In addition, the other side of the glass holder 120 may be provided with a latch 160 to lock the door 100 when the door 100 closes the insertion port 11.

Figure 6:
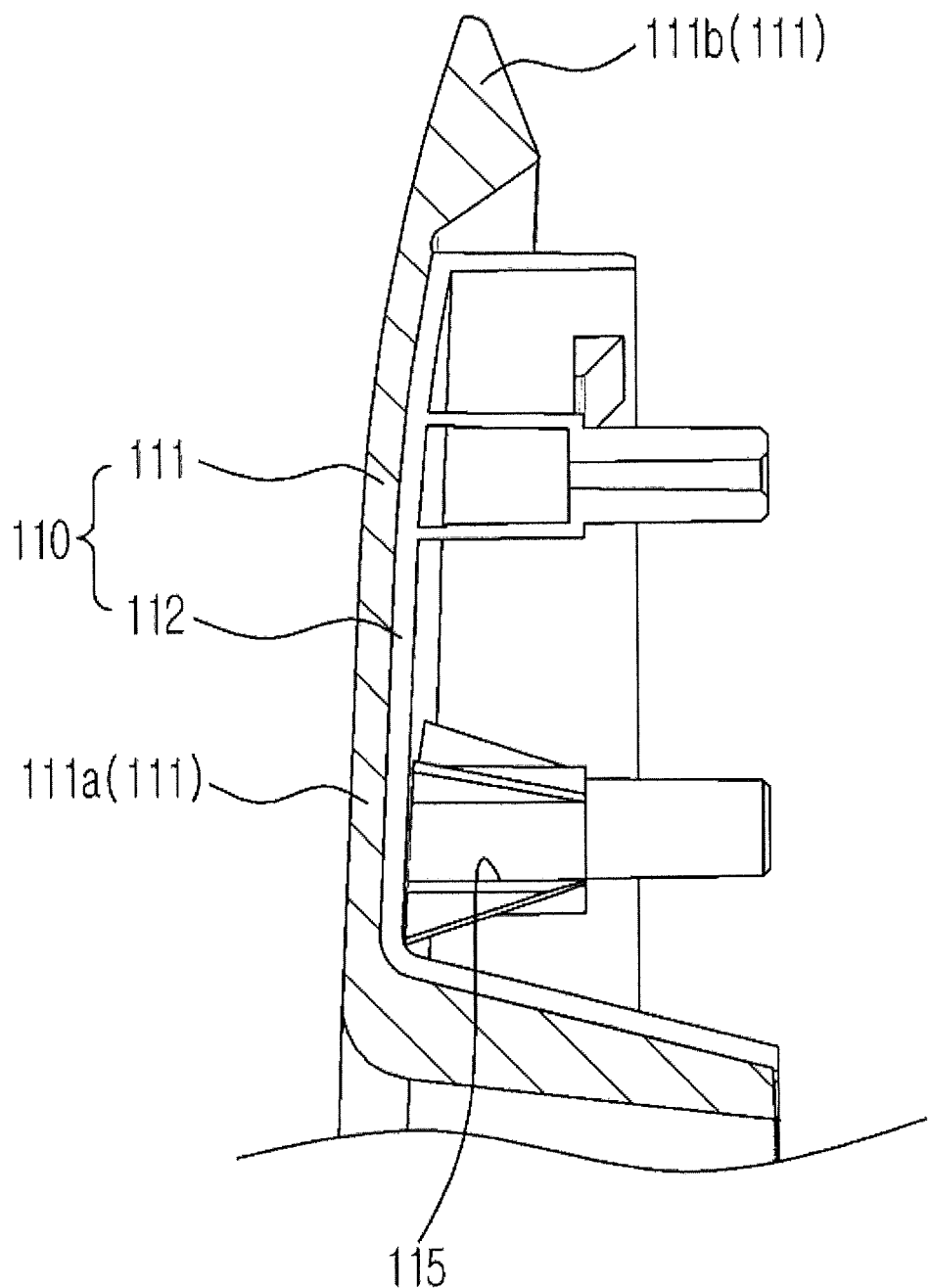
FIG. 6 is a cross-sectional view of the door cover according to the embodiment of the present disclosure.
Figure 7:
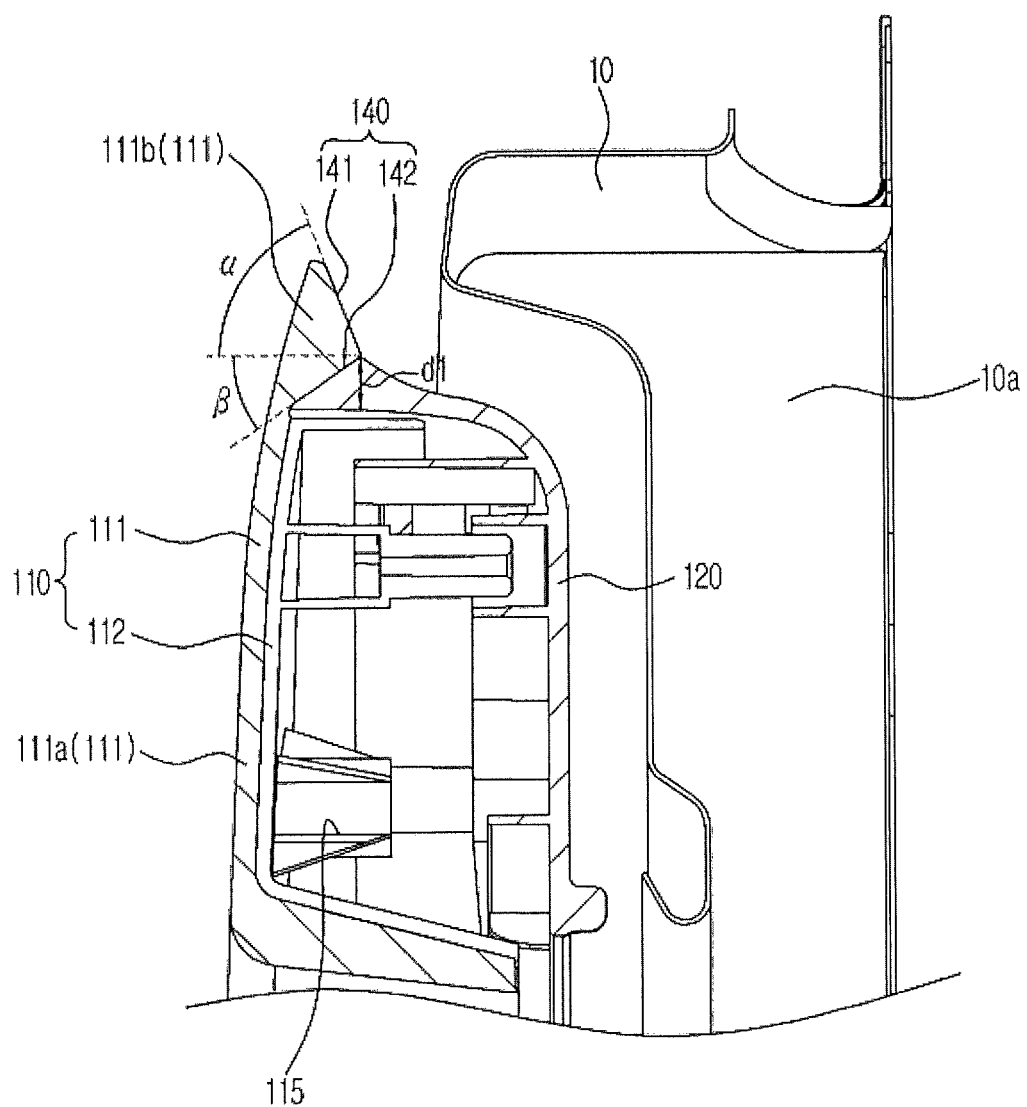
FIG. 7 is a cross-sectional view illustrating a coupled state of a door cover and a glass holder according to the embodiment of the present disclosure.

FIG. 6 is a cross-sectional view of the door cover according to the embodiment of the present disclosure. FIG. 7 is a cross-sectional view illustrating a coupled state of the door cover and the glass holder according to the embodiment of the present disclosure.

As shown in FIGS. 6 and 7, the door cover 110 engages with the glass holder 120. The door cover 110 is integrally formed. The first section 111 made of a transparent material is located outside the door cover 110, and the second section 112 made of an opaque material is located inside the first section 111. Referring to the drawings, a coupling protrusion 115 of the door cover 110 is inserted into the coupling hole 125 of the glass holder 120 so that the door cover 110 is coupled to the glass holder 120. However, the present disclosure is not limited thereto, and the glass holder 120 and the door cover 110 may also be coupled by the hook structure, as will be described later.

The first section 111 may include a first area 111*a* which is coupled with the second section 112 and a second area 111*b* which is not coupled with the second section 112. Since the first section 111 is made of a transparent material, the second area 111*b*, which is not coupled with the second section 112, may be formed of a transparent material. In addition, since the first area 111*a* is coupled with the second section 112 and the second section 112 is projected onto the first area 111*a*, a user may view the second section 112 projected onto the first section 111 from the outside. The first and second areas may be provided in a concentric form, and the first area may be located at the center of the concentric form. Since the second area 111*b* is not coupled with the second section 112 and thus incident light from the outside is scattered upon the second area 111*b*, the second area may appear a metallic color when viewed from outside.

The first section 111 may include an oblique portion 140 inclined by a predetermined angle. The oblique portion 140 is formed at an edge portion 141 of the first section 111. An angle, by which the edge portion 141 is inclined with respect to a vertical surface of the door cover 110, is defined as "α". In the embodiment of the present disclosure, α may be set as an angle of from 40° to less than 50°. However, the present disclosure is not limited thereto, and α may be set as an angle of from greater than 0° to less than 90°.

The oblique portion 140 is also formed at a coupled surface 142 between the door cover 110 and the glass holder 120. An angle, by which the coupled surface 142 is inclined with respect to the vertical surface of the door cover 110, is defined as "β". In the embodiment of the present disclosure, β may be set as an angle of from 40° to less than 50°. However, the present disclosure is not limited thereto, and β may be set as an angle of from greater than 0° to less than 90°.

In the embodiment of the present disclosure, α and β may be asymmetrical with respect to each other. The maximum thickness d1 of the glass holder 120 coupled to the oblique portion 140 may be less than 1 cm.

In the embodiment of the present disclosure, the first section 111 is made of a transparent material and the oblique portion 140 is provided at the edge portion 141 of the first section 111, thereby generating a difference in refractive indexes during penetration of light. Accordingly, a boundary between the first area 111*a* and the second area 111*b* appears a metallic color due to the difference in refractive indexes. That is, the coupled surface 142 between the door cover 110 and the glass holder 120 appears a metallic color.

In the embodiment of the present disclosure, when a user views the washing machine 1 from the outside, a boundary between the cabinet 10 and the door 100 appears a metallic color. Accordingly, even when separate decorations are not added to the door 100, it may be possible to distinguish the door 100 from the cabinet 10. In addition, when the grip portion 114 is located at the inside surface of the door 100 instead of the outside surface thereof, the door 100 should be distinguishable from the cabinet 10. In this case, the door 100 may be distinguished from the cabinet 10 by the simplified process described hereinabove. Furthermore, the coupled surface 142 appears a different color from that of the door cover 110 or the glass holder 120. To this end, however, the present disclosure does not use a different sort of plastic and also does not require post-processing after injection molding of the door cover 110. Therefore, it may be possible to provide a design effect and a reduction in manufacturing costs through process simplification.

Figure 8:
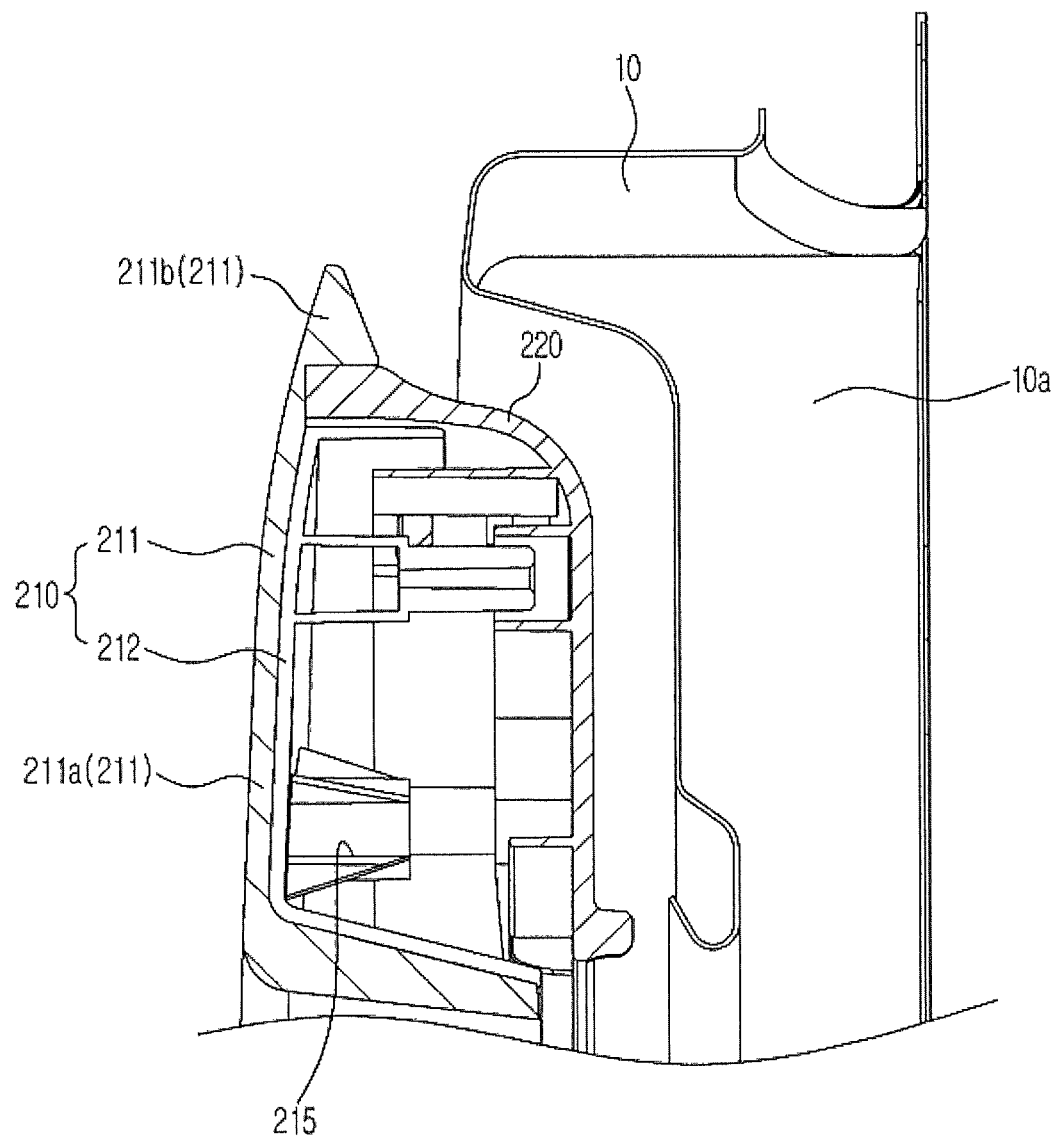
FIG. 8 is a cross-sectional view illustrating a coupled state of a door cover and a glass holder according to another embodiment of the present disclosure.

FIG. 8 is a cross-sectional view illustrating a coupled state of a door cover and a glass holder according to another embodiment of the present disclosure.

Similarly to the embodiment illustrated in FIG. 7, the door cover 210 is provided with a first section 211 and a second section 212 and the door cover 210 is coupled to the glass holder 220 through a coupling groove according to another embodiment of the present disclosure illustrated in FIG. 8.

However, the embodiment of FIG. 8 differs in that the door cover 210 is not provided with the oblique portion as shown in FIG. 7.

Figure 9:
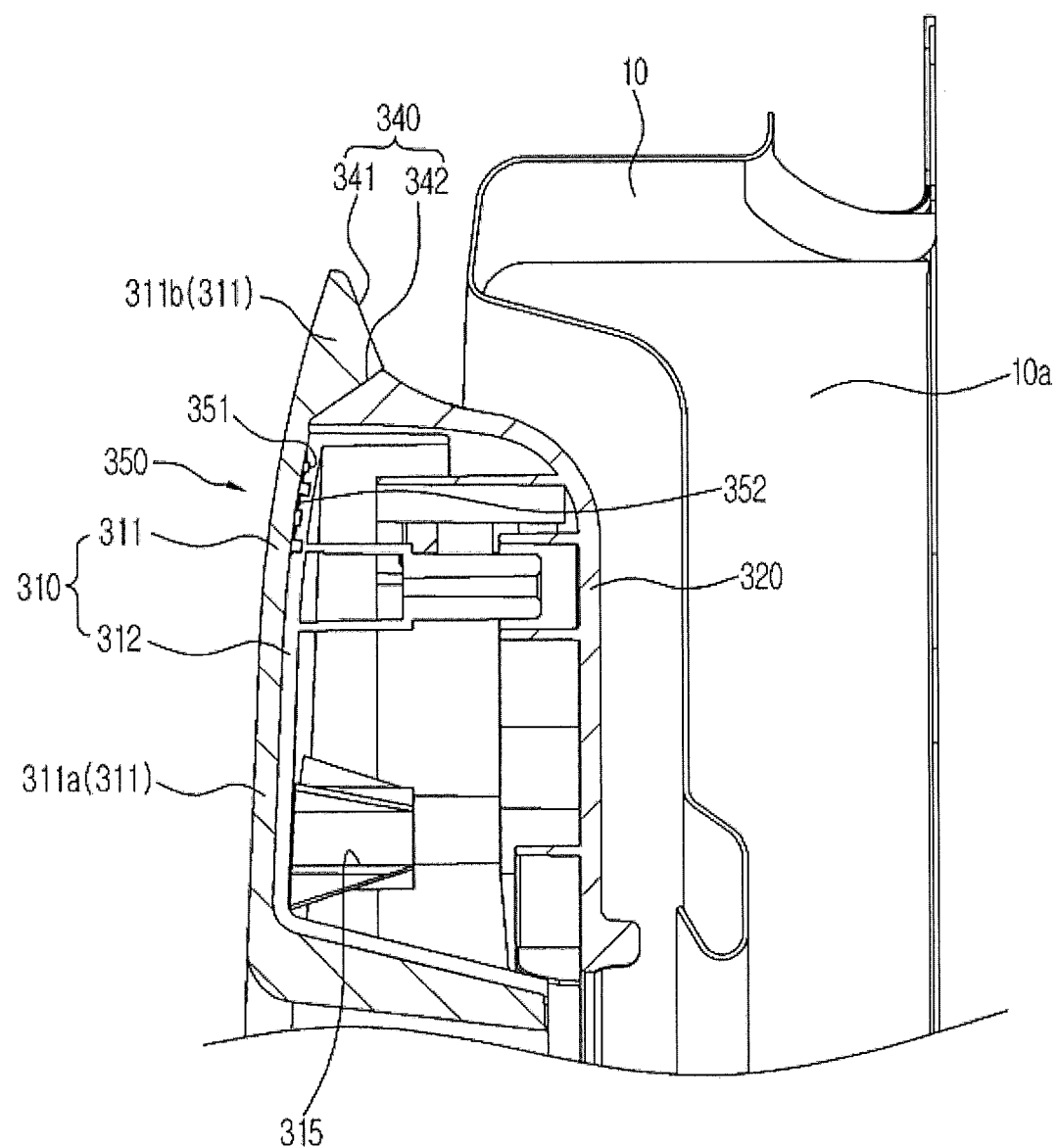
FIG. 9 is a cross-sectional view illustrating a coupled state of a door cover and a glass holder according to yet another embodiment of the present disclosure.

FIG. 9 is a cross-sectional view illustrating a coupled state of a door cover and a glass holder according to yet another embodiment of the present disclosure.

In accordance with yet another embodiment of the present disclosure illustrated in FIG. 9, a roughened portion 350 may be formed on at least one of a first section 311 and a second section 312. The roughened portion 350 is provided by alternately forming a protrusion portion 351 protruding from the surface of the first or second section 311 or 312 and a recessed portion 352 recessed into the surface thereof.

In accordance with the embodiment of the present disclosure, the roughened portion 350 is arranged on the inside surface of the first section 311. In other words, the roughened portion 350 may be provided at a boundary between the first section 311 and the second section 312, but the present disclosure is not limited thereto. In accordance with the embodiment of the present disclosure, since the roughened portion 350 is arranged on the inside surface of the first section 311 made of a transparent material, light projected onto the door cover 310 is rapidly changed in tone due to the protrusion portion 351 and the recessed portion 352 of the roughened portion 350. Accordingly, a shape of the roughened portion 350 formed by the protrusion portion 351 and the recessed portion 352 is noticeably rendered to the door cover 310. The roughened portion 350 may be provided in various shapes, and thus the various shapes may be rendered to the door cover 310. In addition, when the second section 312 made of an opaque material has a variety of colors, the second section 312 may create new pleasing design aesthetics together with the roughened portion 350.

Figure 10:
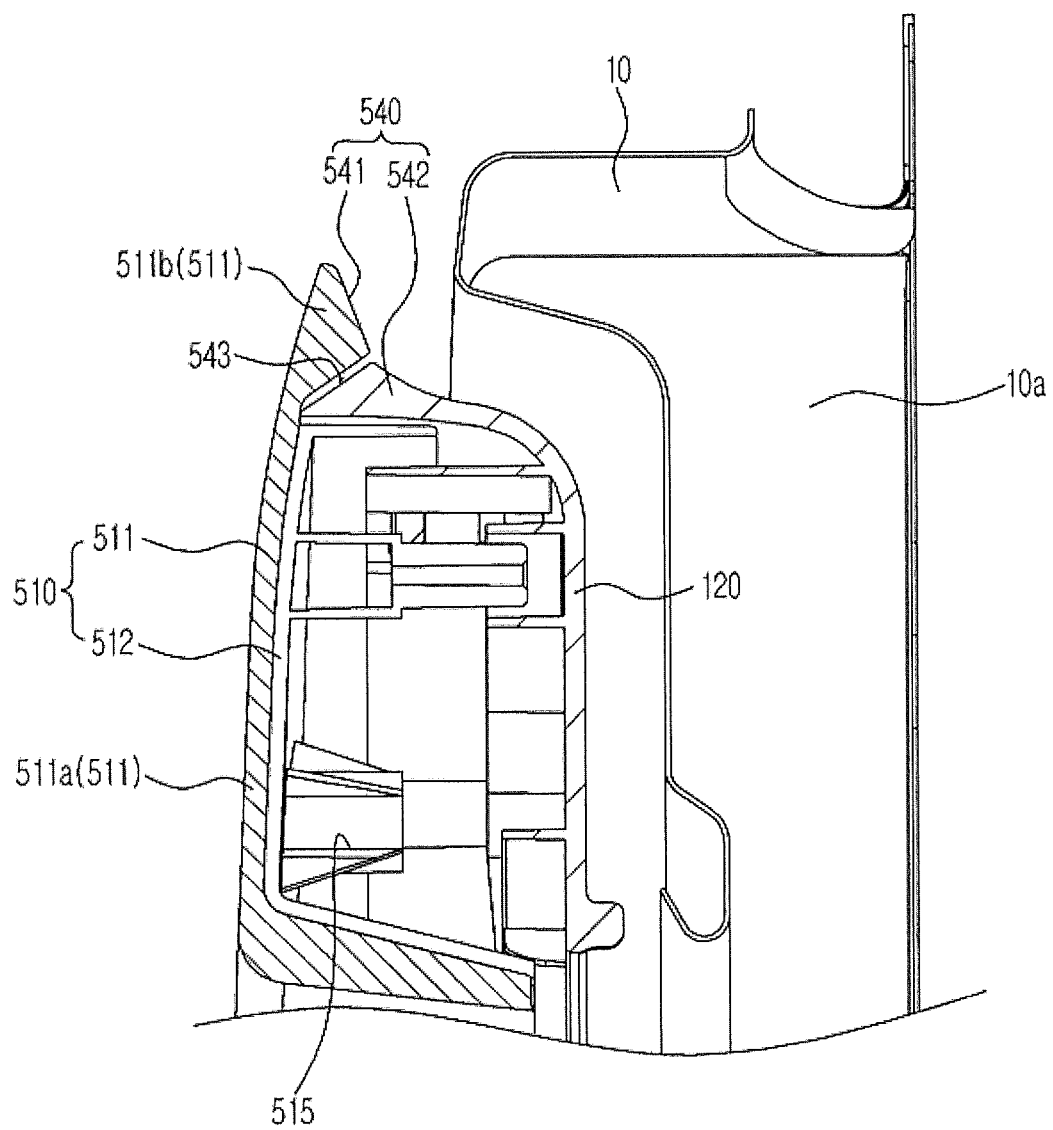
FIG. 10 is a cross-sectional view illustrating a coupled state of a door cover and a glass holder according to yet another embodiment of the present disclosure.

FIG. 10 is a cross-sectional view illustrating a coupled state of a door cover and a glass holder according to yet another embodiment of the present disclosure.

In accordance with yet another embodiment of the present disclosure, a gap 543 may be defined such that at least a portion of a first section 511 is spaced apart from at least a portion of a second section 512 with the gap being interposed therebetween. The gap 543 may be provided between an edge portion 541 of the first section 511 and a coupled surface 542 of the second section 512.

Since incident light from the outside of the door cover 510 is scattered through the gap 543, a boundary between the first section 511 and the second section 512 may appear a metallic color. Although the gap 543 may be about 1 mm in width, the present disclosure is not limited thereto.

Figure 11:
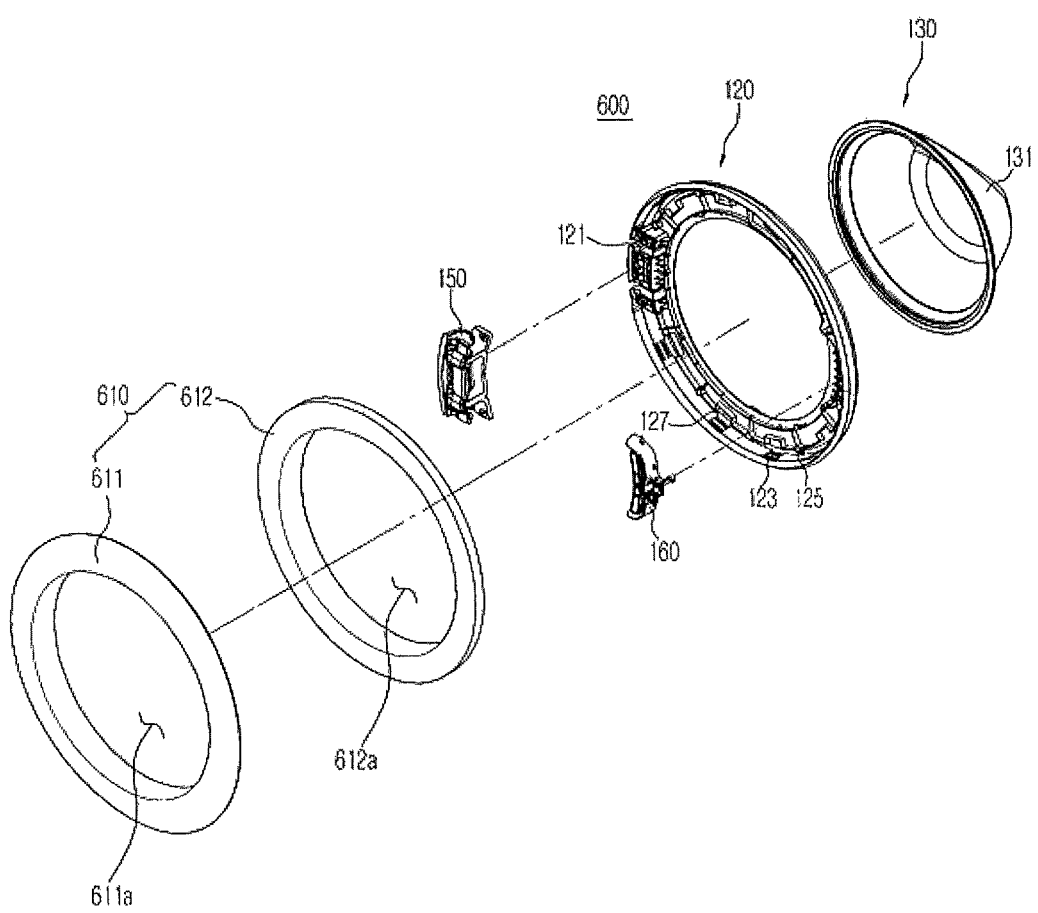
FIG. 11 is an exploded perspective view of a door according to yet another embodiment of the present disclosure.

FIG. 11 is an exploded perspective view of a door according to yet another embodiment of the present disclosure.

As shown in FIG. 11, the door 600 includes a door cover 610, a glass 130, and a glass holder 120, as described above. Since like reference numerals refer to the above-mentioned similar elements, no description will be given thereof.

In accordance with yet another embodiment of the present disclosure, a first section 611 and a second section 612 of the door cover 610 may be respectively provided as separate members. Thus, the door cover 610 may be configured by coupling the first section 611 and the second section 612. The first and second sections 611 and 612 may be coupled to each other by various methods. For example, the first and second sections 611 and 612 may be fastened using a fastening member or be bonded via ultrasonic fusion.

Figure 12A:
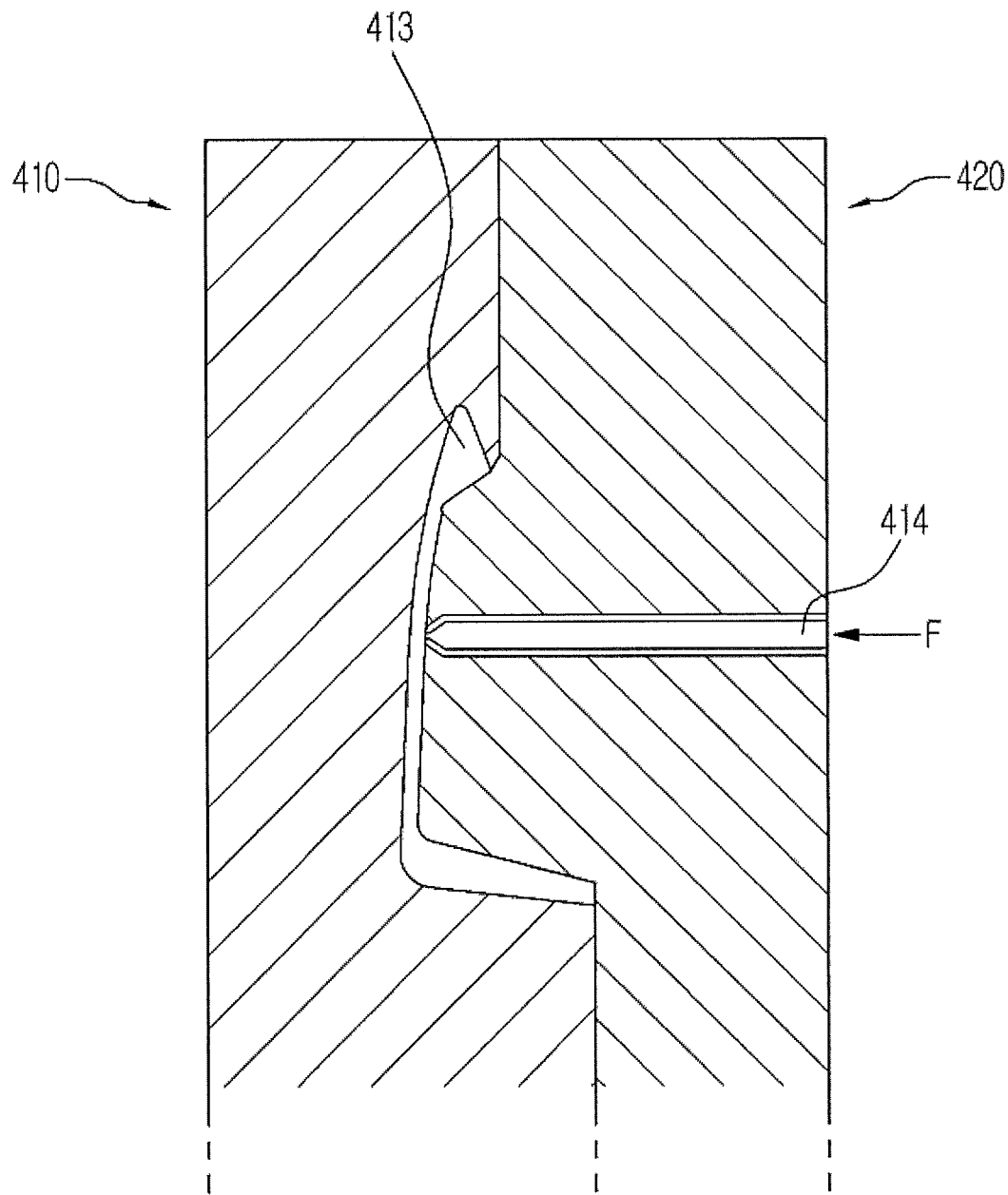
FIGS. 12A to 12C are views schematically illustrating a process via which the door cover according to each of the embodiments of the present disclosure is injection-molded.
Figure 12B:
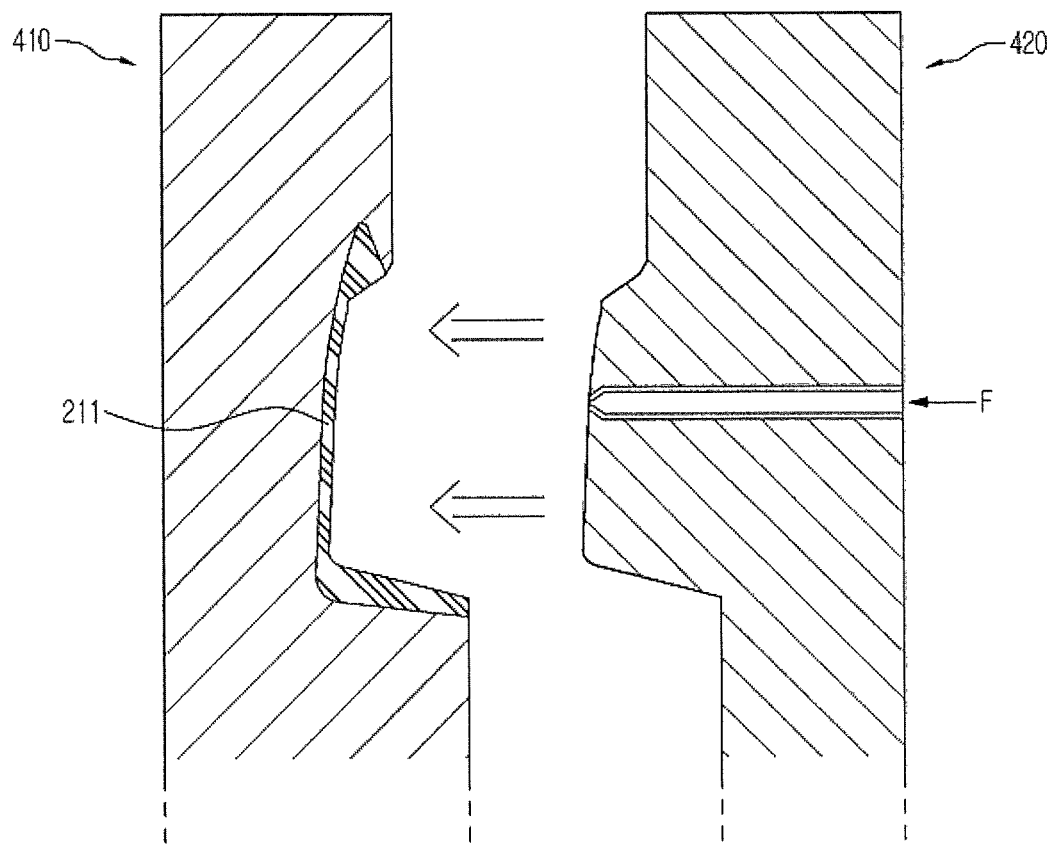
Figure 12C:
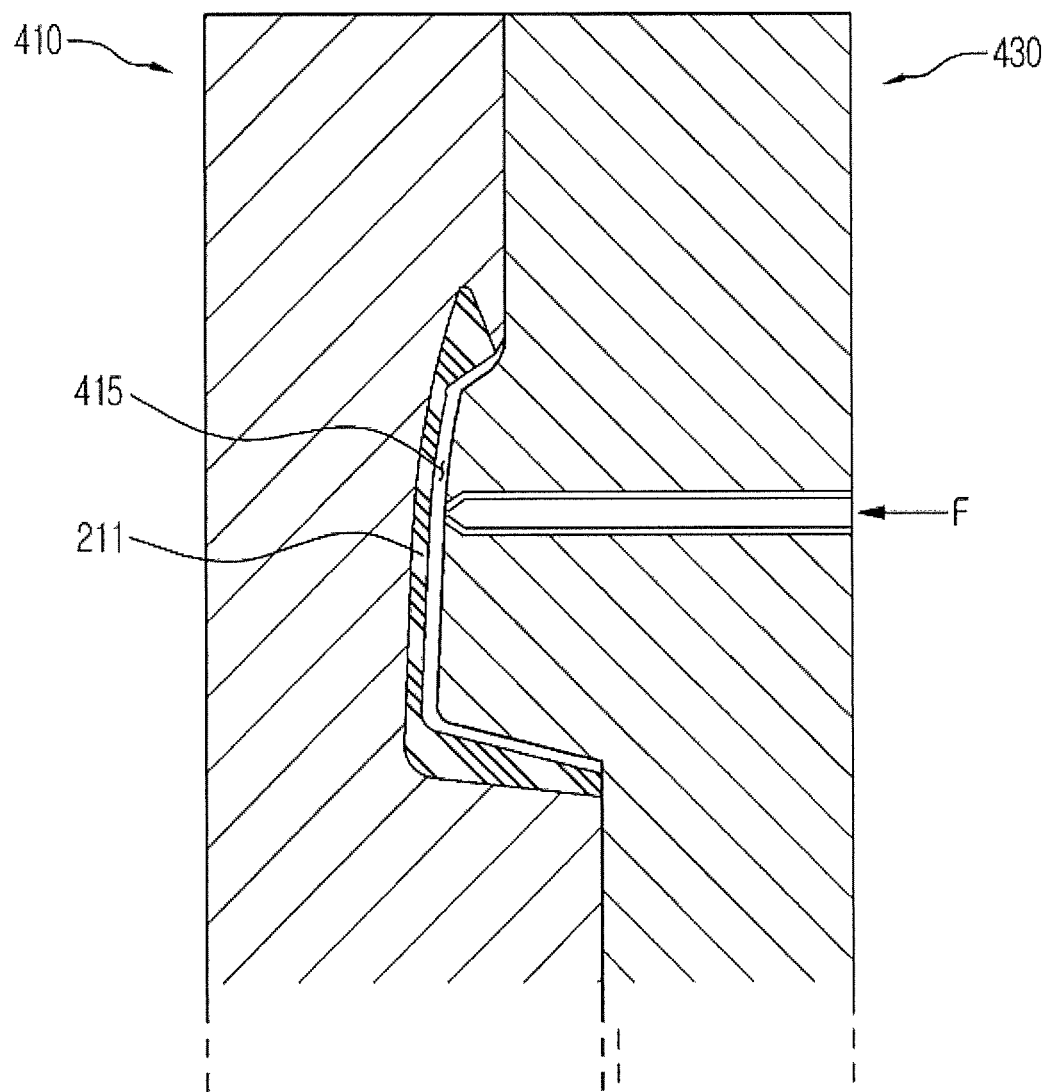

FIGS. 12A to 12C are views schematically illustrating a process via which the door cover according to each of the embodiments of the present disclosure is injection-molded.

FIGS. 12A to 12C illustrate a process via which the first section is primarily injection-molded and the second section is secondarily injection-molded. Hereinafter, an injection molding process will be described.

As shown in FIG. 12A, a first injection mold 420 approaches and is pressed against a base mold 410 in order to injection-mold a shape of a primary injection portion 413 as the first section. The primary injection portion 413, which is a space where the first section is molded, is formed at a part to which the base mold 410 and the first injection mold 420 approach each other. The first injection mold 420 is provided with a primary injection hole 414 through which a primary injection material is injected into the primary injection portion 413 in a primary injection direction F. The first section is formed by injecting the primary injection material through the primary injection hole 414 to fill the primary injection portion 413.

FIG. 12B illustrates a process via which the primary injection for the first section is completed and then a second injection mold 430 as a sealing mold is coupled to the base mold 410. When the primary injection is completed, the first injection mold 420 is removed and the second injection mold 430 approaches toward the base mold 410. Since the primary injection is completed, the first section 211 as a primary injected product is injection-molded on the base mold 410.

FIG. 12C illustrates a coupled state of the second injection mold 430 as the sealing mold and the base mold 410. A secondary injection portion 415, which is a space where the second section is molded, is formed at a part to which the base mold 410 and the second injection mold 430 approach each other. The second injection mold 430 is provided with a secondary injection hole 416 through which a secondary injection material is injected into the secondary injection portion 415 in a secondary injection direction F. The second section is formed by injecting the secondary injection material through the secondary injection hole 416 to fill the secondary injection portion 415.

A mark of the secondary injection material injected through the secondary injection hole 416 may be viewed from the rear of the door cover 210. In accordance with the embodiment of the present disclosure illustrated in FIG. 4B, it may be possible to view four secondary injection holes 113 located at the rear of the door cover 210.

The door cover molded via the first injection and the second injection may undergo a cooling process in order to prevent cracking due to surface temperature variation of the door cover.

Figure 13:
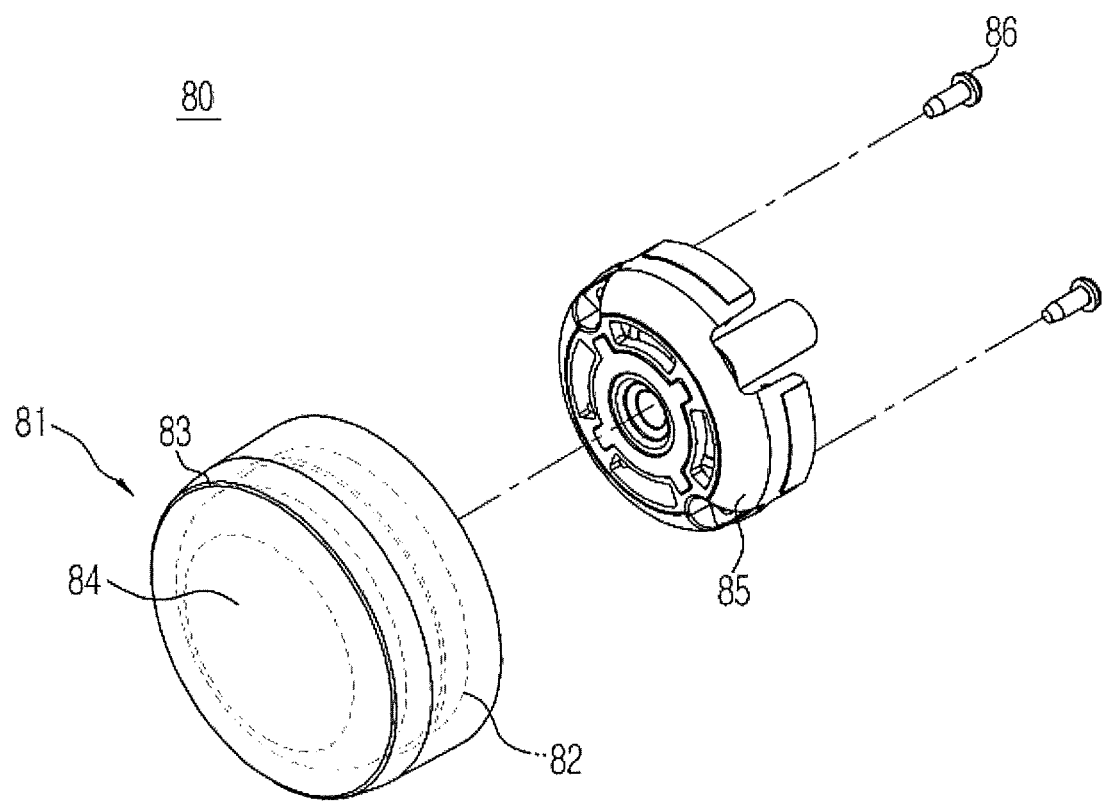
FIG. 13 is an exploded perspective view of a knob according to the embodiment of the present disclosure.

FIG. 13 is an exploded perspective view of the knob according to the embodiment of the present disclosure.

As shown in FIG. 13, the knob 80 includes a knob cover 81, a knob holder 82 disposed inside the knob cover 81, and a knob body 85 disposed inside the knob holder 82.

The knob cover 81 includes a first section 83 and a second section 84 which are made of different materials, similar to the door cover according to the embodiment of the present disclosure. The first section 83 may be made of a transparent material, whereas the second section 84 may be made of an opaque material. As an example, the first section 83 may be made of at least one of plastics such as PMMA (polymethyl methacrylate) and PC (polycarbonate). The second section 84 may be made of an ABS (acrylonitrile butadiene styrene copolymer) resin. The first and second sections 83 and 84 may be formed integrally by the above-mentioned injection molding process.

Figure 14:
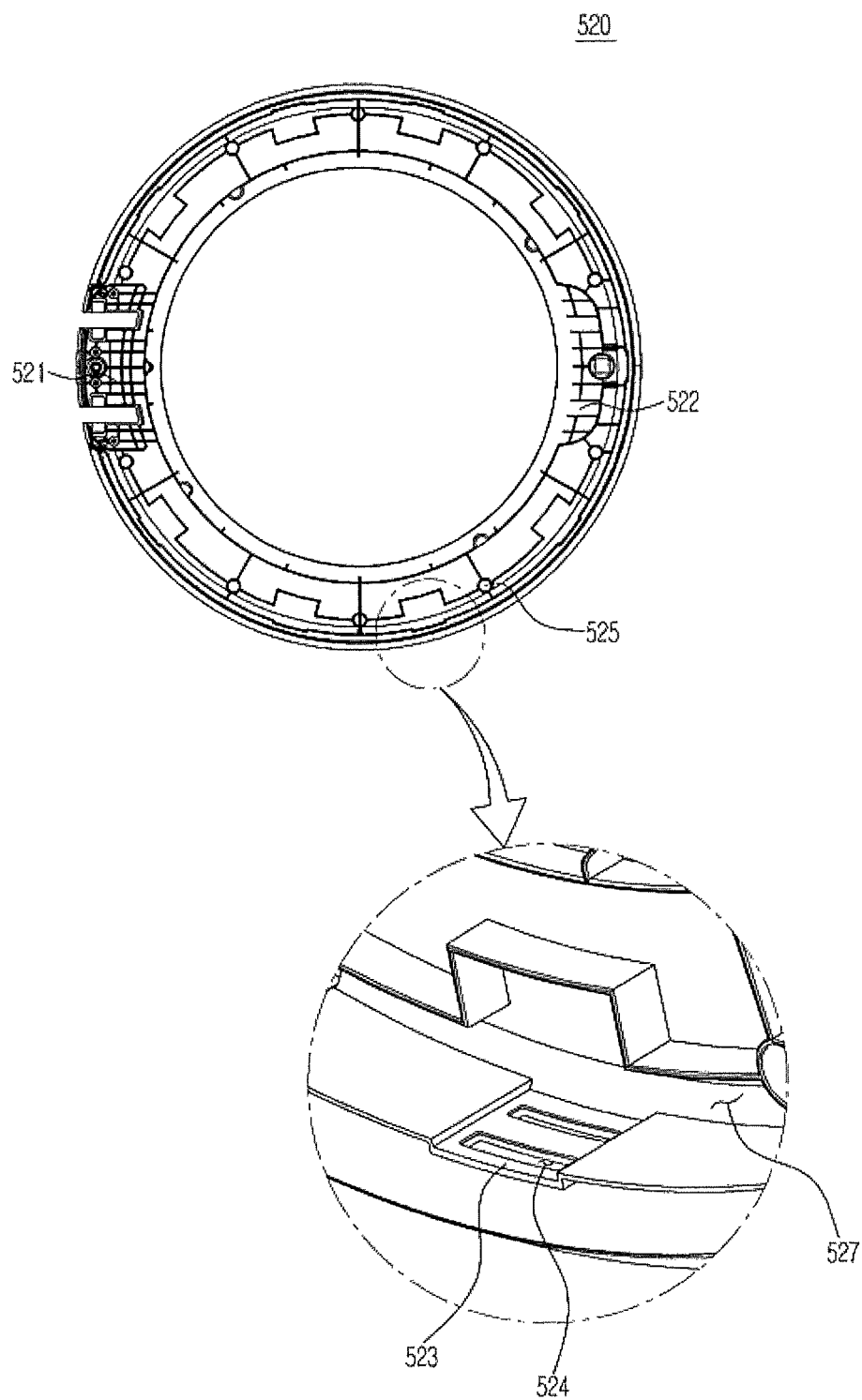
FIG. 14 is a view illustrating a glass holder according to a further embodiment of the present disclosure.
Figure 15:
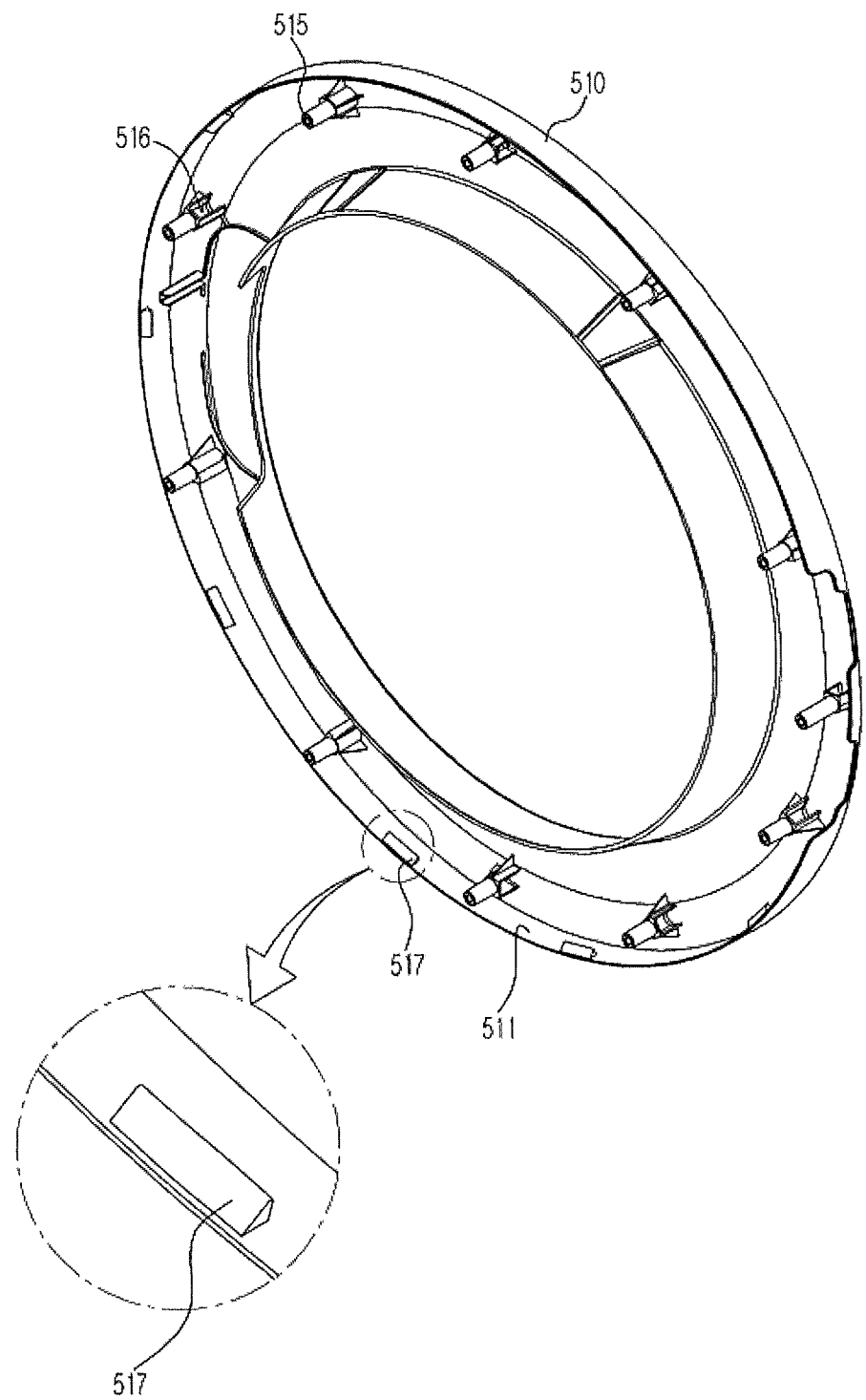
FIG. 15 is a view illustrating a door cover according to the further embodiment of the present disclosure.
Figure 16:
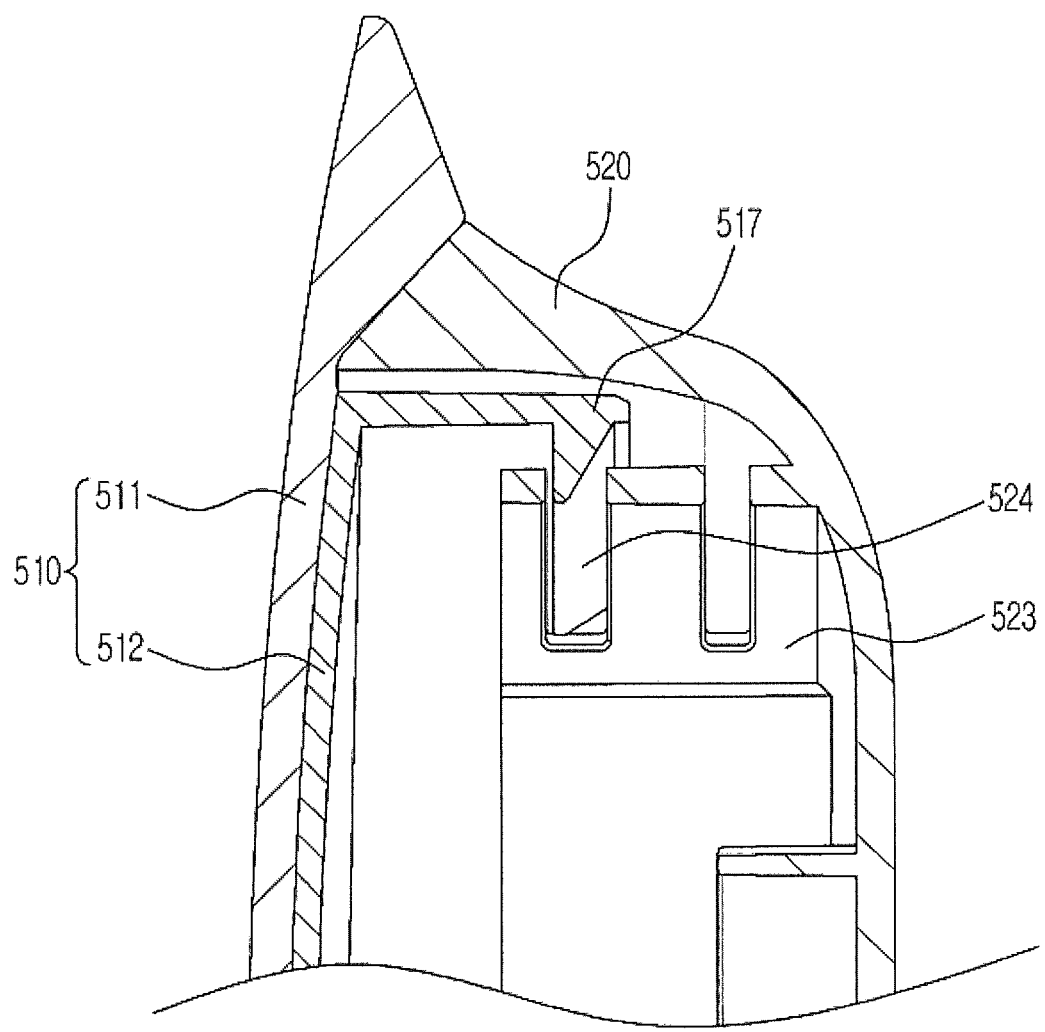
FIG. 16 is a cross-sectional view illustrating a coupled state of the door cover and the glass holder according to the further embodiment of the present disclosure.

FIG. 14 is a view illustrating a glass holder according to a further embodiment of the present disclosure. FIG. 15 is a view illustrating a door cover according to the further embodiment of the present disclosure. FIG. 16 is a cross-sectional view illustrating a coupled state of the door cover and the glass holder according to the further embodiment of the present disclosure.

As shown in FIGS. 14 to 16, the door cover 510 and the glass holder 520 may be coupled to each other by a hook structure. One side of the glass holder 520 may be provided with a coupling portion 521, and the other side of the glass holder 520 may be provided with a latch reception portion 522.

The glass holder 520 may include at least one hook coupling groove 524 so as to be coupled to the door cover 510. A hook 517 of the door cover 510 may be coupled to the outside hook coupling groove 524 among the hook coupling grooves 524 shown in the drawing. The hook coupling groove 524 may be formed in at least a portion of an inner wall 523 of the glass holder 520.

In addition, the glass holder 520 may be provided with at least one coupling hole 525 to which a fastening member such as a screw may be fastened. However, the coupling hole 525 is an optional, non-essential component.

Furthermore, a passage 527 may be arranged in at least a portion of a bottom surface of the glass holder 520 so as to be filled with a bonding material. Urethane may be used as the bonding material. The bonding material serves to enhance coupling force by filing a clearance between the glass holder 520 and the door cover 510.

At least one hook 517 coupled to the hook coupling groove 524 may be located at the rear of the door cover 510.

At least one hook 517 may be provided at the rear of the door cover 510 such that the door cover is coupled to the glass holder 520. The hook 517 may be provided at an inner wall 523 of the door cover 510. In addition, the rear of the door cover 510 may be provided with at least one coupling protrusion 515 protruding from a base 516 which is inserted into the associated coupling hole 525.

The door cover 510 may be coupled to the glass holder 520 in such a manner that the hook 517 of the door cover 510 is coupled to the hook coupling groove 524 of the glass holder 520. The hook coupling groove 524 may have a smaller width than at least a portion of the hook 517. Accordingly, when the hook 517 is inserted into the hook coupling groove 524, interference occurs between the hook 517 and the inner wall 523 of the glass holder 520 formed with the hook coupling groove 524. Therefore, it may be possible to enhance coupling force between the hook 517 and the hook coupling groove 524.

When the door cover 510 is coupled to the glass holder 520 using the hook 517 and the hook coupling groove 524, coupling using the fastening member such as the screw is not required. Thus, the coupling protrusion 515 of the door cover 510 and the coupling hole 525 of the glass holder 520 are provided as a preventative measure against damage to the hook 517 or the hook coupling groove 524.

Conventionally, the coupling protrusion 515 is coupled to the coupling hole 525 by a fastening member (not shown) such as a screw, and ten fastening members (not shown) in total are required to enhance coupling force therebetween. However, in accordance with the embodiment of the present disclosure, the above fastening member (not shown) is not required and thus an additional process due to the fastening member is not required. As a result, it may be possible to achieve a reduction in manufacturing costs and simplification of processes.

As is apparent from the above description, manufacturing costs of a door may be reduced without the need for post-processing, and it may be possible to provide an eco-friendly washing machine having pleasing design aesthetics.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
    a cabinet defining an external appearance thereof and having an insertion port;
    a tub arranged inside the cabinet and capable of accommodating wash water;
    a drum arranged inside the tub and capable of accommodating laundry; and
    a door to open or close the insertion port, the door comprising a door cover disposed at a front side of the door when the door closes the insert port, a glass protruding inward of the cabinet, and a glass holder coupled to a rear side of the door cover to support the glass and including a coupling recess, wherein
    the door cover comprises:
        a first section made of a transparent material,
        a second section made of a material having a different refractive index than the transparent material, and arranged at a rear side of the first section to be visible through the first section, and
        a coupling protrusion disposed at a rear side of the second section of the door cover and inserted into the coupling recess of the glass holder, to thereby couple the door cover to the glass holder, and
    the first section comprises:
        a first area in direct contact with the second section, and
        a second area which is not in direct contact with the second section and is positioned outside the first area, and includes
            an edge portion provided to face a rear side of the door when the door closes the insertion port, and
            a coupled surface extended from the edge portion such that the glass holder comes into contact with the coupled surface when the glass holder is coupled to the door cover,
        wherein the coupled surface is inclined toward an inside of the door.

2. The washing machine according to claim 1, wherein the first section comprises a rim portion such that at least a portion of the glass holder is visible through the rim portion of the first section.

3. The washing machine according to claim 1, wherein at least one of the first and second sections is formed with a roughened portion configured by alternately forming a protrusion portion protruding from a surface of the first or second section and a recessed portion recessed into the surface thereof.

4. The washing machine according to claim 1, wherein a gap is defined such that at least a portion of the first section is spaced apart from at least a portion of the second section with the gap being interposed therebetween, so that light is scattered between the first section and the second section.

5. The washing machine according to claim 1, wherein the first section is made of at least one of PMMA (polymethyl methacrylate) and PC (polycarbonate).

6. The washing machine according to claim 1, wherein the second section is made of an ABS (acrylonitrile butadiene styrene copolymer) resin.

* * * * *